US009009297B2

(12) United States Patent
Masputra et al.

(10) Patent No.: US 9,009,297 B2
(45) Date of Patent: *Apr. 14, 2015

(54) METHOD AND APPARATUS FOR IDLING A NETWORK CONNECTION

(75) Inventors: Cahya A. Masputra, San Jose, CA (US); Michael R. Van Milligan, San Francisco, CA (US); Joshua V. Graessley, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 12/857,421

(22) Filed: Aug. 16, 2010

(65) Prior Publication Data

US 2011/0179163 A1 Jul. 21, 2011

Related U.S. Application Data

(60) Provisional application No. 61/295,622, filed on Jan. 15, 2010.

(51) Int. Cl.
*G06F 15/173* (2006.01)
*G06F 9/54* (2006.01)
*G06F 1/32* (2006.01)
*H04W 4/00* (2009.01)
*H04L 29/06* (2006.01)

(52) U.S. Cl.
CPC ............... *G06F 9/54* (2013.01); *G06F 1/3203* (2013.01); *G06F 1/3209* (2013.01); *G06F 1/325* (2013.01); *G06F 1/3287* (2013.01); *H04W 4/00* (2013.01); *Y02B 60/1278* (2013.01); *Y02B 60/1282* (2013.01); *Y02B 60/32* (2013.01); *H04L 69/16* (2013.01)

(58) Field of Classification Search
CPC ............................. H04L 47/10; H04L 63/1408
USPC ......................................................... 709/224
See application file for complete search history.

(56) References Cited

U.S. PATENT DOCUMENTS

2002/0138627 A1 9/2002 Frantzen

*Primary Examiner* — Hua Fan
(74) *Attorney, Agent, or Firm* — Park, Vaughan, Fleming & Dowler LLP; Anthony P. Jones (57) ABSTRACT

The described embodiments include a system that configures a network interface. During operation, the system receives a signal from an operating system indicating that the network interface can be idled. The signal is sent from the operating system as soon as the operating system determines that a final route structure that depended on the network interface has expired and been deleted. The system then determines if an application has established a route that uses the network interface since the signal was sent from the operating system. If not, the system causes the network interface to be idled. Otherwise, the system leaves the network interface in a current operating state.

12 Claims, 7 Drawing Sheets

METHOD AND APPARATUS FOR IDLING A NETWORK CONNECTION

RELATED APPLICATIONS

This application is a non-provisional application from, and hereby claims priority under 35 U.S.C. §120 to, U.S. provisional patent application Ser. No. 61/295,622, entitled "Method and Apparatus for Idling a Network Connection," by inventors Cahya Masputra, Michael Van Milligan and Joshua Graessley, filed on 15 Jan. 2010.

BACKGROUND

1. Field

The described embodiments relate to electronic devices that provide network connections. More specifically, the described embodiments relate to electronic devices that facilitate improved idling for network connections.

2. Related Art

Many modern electronic devices include networking subsystems that can be used to transfer data between the device and other devices across a wired or wireless network. For example, these electronic devices can include Bluetooth™ networking subsystems, cellular networking subsystems, universal serial bus (USB) networking subsystems, Institute for Electrical and Electronic Engineers (IEEE) 802.11 wireless network subsystems, Ethernet networking subsystems, or wired or wireless personal-area networking (PAN) subsystems. In these electronic devices, each networking subsystem has an interface that includes the hardware (e.g., transmitters, radios, etc.) and/or software that is used by the electronic devices for communicating on the corresponding network.

In some of these electronic devices, the operating mode of a given networking subsystem's interface is controlled by an interface manager task. One of the functions of the interface manager task can be to determine when to save power by powering-down the interface based on a lack of network traffic on the interface. In these devices, when determining the level of network traffic on the interface, the interface manager task typically determines whether or not packets are being transferred at some minimum rate at a physical layer of interface.

Because the interface manager task uses the rate at which packets are transferred at the physical layer to make the determination about whether to power-down the interface, the interface manager task can erroneously power-down an interface that is still being used by an application. Specifically, if an application is still active (e.g., has not been exited by a user), but has simply not transferred packets using the interface for a predetermined amount of time, the interface manager task can power-down the interface. When the application subsequently resumes transferring packets, the application finds that the interface is down and can signal an error to the user (or may be forced to re-activate the interface). This can frustrate a user. For example, assume that two or more users are using a game application on portable electronic devices (e.g., laptops or smart phones) that rely on a network connection to transfer game data between the devices. If a pause of longer than a predetermined time occurs while transferring game data, the interface manager task in one of the devices may power-down the corresponding interface (or otherwise adjust the operating mode of the interface), which can disrupt the electronic device's ability to transfer game data through the interface, potentially leading to an interruption of the game.

SUMMARY

The described embodiments include a system that configures a network interface. During operation, the system receives a signal from an operating system indicating that the network interface can be idled. The signal is sent from the operating system as soon as the operating system determines that a final route structure that depended on the network interface has expired and been deleted. The system then determines if an application has established a route that uses the network interface since the signal was sent from the operating system. If not, the system causes the network interface to be idled. Otherwise, the system leaves the network interface in a current operating state.

In some embodiments, when determining if another application has established a route, the system queries the operating system and/or an application to determine if another application has established a route and/or searches any route structures in the computer system to find a matching route.

In some embodiments, when causing the network interface to be idled, the system: (1) powers-down the network interface; (2) switches the network interface to a low-power mode; or (3) configures the network interface to be used at a normal/active power level, but only for performing low-priority or maintenance operations.

In some embodiments, causing the network interface to be idled includes causing another application (or applications) to place the network interface in an idled state. In addition, in some embodiments, when causing the application(s) to idle the network interface, the system can inform at least one other application that the network interface is being idled.

In some embodiments, the application(s) that idle the interface include an interface manager and/or another application that can place the network interface in the idle state.

The described embodiments include a processing subsystem that scans for expired route structures to be deleted in an operating system. During operation, the processing subsystem executes functions in a route domain. When executing the functions in the route domain, if a drain function pointer in the route domain points to a drain function in the route domain, the processing subsystem executes the drain function to scan for expired route structures. Otherwise, if the drain function pointer is set to NULL, the processing subsystem skips (i.e., does not execute) the drain function and instead uses a network protocol stack mechanism in the operating system to scan for expired route structures.

The described embodiments include an apparatus with a network interface and a processing system for managing an operating state of a network interface. In these embodiments, during a boot-up sequence, the processing subsystem configures the network interface. When configuring the network interface, the processor asserts an aggressive-idling flag for the network interface when: (1) route structures that depend on the network interface are to be expired using a shortened route expiration timer value; and (2) route structures with expired route expiration timers are scanned for using a drain function in a route domain as long as the network interface is not idle.

The described embodiments include a computer-readable storage medium that can store an interface data structure used for keeping track of an operating state of a corresponding network interface in a computer system. In these embodiments, the interface data structure includes an aggressive-idling flag and a route reference counter. The aggressive-idling flag, when asserted, causes an operating system to use a shortened expiration time for route structures that depend on the network interface and causes the operating system to use a drain function in a route domain to scan for route structures with expired route expiration timers. The route reference counter in the interface data structure can be used to keep track of how many route structures depend on the network interface. In these embodiments, when the route reference counter is equal to zero, the network interface can be idled.

BRIEF DESCRIPTION OF THE FIGURES

In the figures, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in the following description can be embodied as program code that is stored in a computer-readable storage medium. When a computer system (see, e.g., computer system 100 in FIG. 1) reads and executes the program code stored on the computer-readable storage medium, the computer system performs the methods and processes in the program code stored in the computer-readable storage medium.

The methods and processes described in the following description can be included in hardware modules. For example, the hardware modules can include, but are not limited to, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that can be configured (e.g., by executing instructions) to perform the methods and processes.

Overview

The described embodiments facilitate "aggressive" idling for interfaces in a network subsystem. Depending on the embodiment, "idling" can mean that the interface is completely powered-down, switched to a low-power (but at least partially operational) mode, or used normally (but only for performing low-priority or interface maintenance operations). Note that "aggressive" as used in this description denotes a more responsive or intelligent idling for interfaces, which can facilitate optimizing the usage of system resources.

In the described embodiments, a given interface can be configured to be aggressively idled. For such an interface, an operating system monitors routes that refer to the interface to determine when the routes are no longer in use and have therefore expired and been deleted. When the last route referring to the interface is deleted, the operating system can notify an interface manager task (e.g., can notify a configuration agent, which then notifies the interface manager task) that the interface is a candidate for idling. The interface manager task can then idle the interface.

In some embodiments, upon receiving the notification that an interface is a candidate for idling, the interface manager task checks with the operating system to ensure that no routes that refer to the interface have been established since the notification was sent by the operating system. If a new route that refers to the interface has been established, the interface manager task can ignore the notification and leave the operating mode of the interface unchanged.

In the described embodiments, the operating system includes a mechanism for periodically performing tasks associated with kernel protocol domains. In these embodiments, the operating system includes a list of kernel protocol domains that are each associated with a different protocol in the operating system (e.g., routing, IPv4, etc.). Each of the kernel protocol domains is associated with a set of domain-specific functions that perform one or more tasks for a corresponding domain. The operating system periodically cycles through the list of kernel protocol domains and executes the associated domain-specific functions. The described embodiments also include a route domain for which one of the domain-specific functions is drain function. When executed, the drain function deletes expired routes in the operating system.

In the described embodiments, each route includes an expiration timer that is set by the operating system when a route is no longer being used by an application (e.g., when the application closes the socket that refers to the route). When the timer expires, the route is expired and can be deleted by either: (1) a corresponding protocol mechanism in the operating system; or (2) the drain function for the route domain. In these embodiments, if an interface referred to by the route is configured to be aggressively idled, the timer is set to an aggressive, short expiration time. Otherwise, if the interface referred to by the route is not configured to be aggressively idled, the timer is set to a default expiration time that is typically orders of magnitude longer than the short expiration time.

In some embodiments, the operating system maintains an aggressive interface counter that the operating system uses to keep track of the number of active interfaces that are configured to be aggressively idled. As each interface that is configured to be aggressively idled is activated, the operating system increments the aggressive interface counter. On the other hand, as each interface that is configured to be aggressively idled is idled, the operating system decrements the aggressive interface counter. When the aggressive interface counter is equal to zero (i.e., no active interfaces are configured with aggressive idling), the operating system sets a pointer to the drain function in the route domain to NULL, which prevents the drain function from being executed by the operating system on each cycle through the kernel protocol domains. However, when the aggressive interface counter is non-zero, the operating system sets the pointer to the drain function in the route domain to point to the drain function.

Computer System

Figure 1:
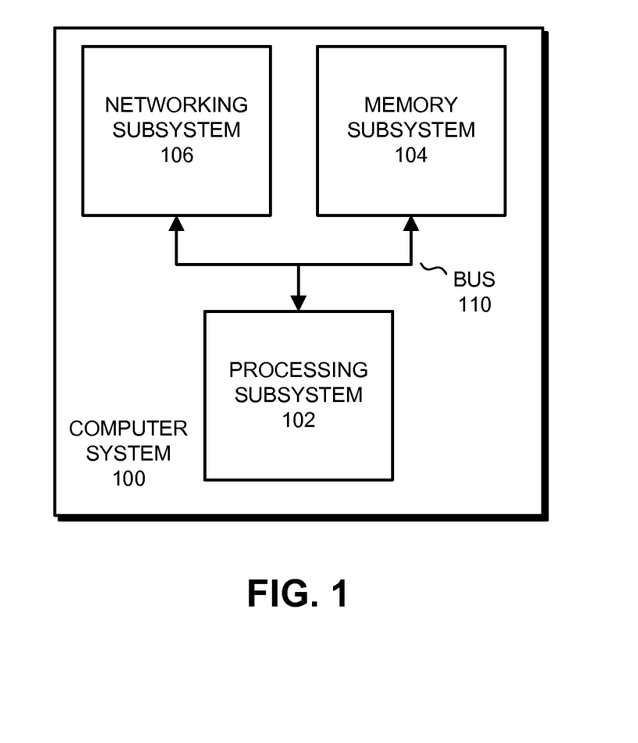
FIG. 1 presents a block diagram of a computer system in accordance with the described embodiments.

FIG. 1 presents a block diagram of computer system 100 in accordance with the described embodiments. Computer system 100 includes processing subsystem 102, memory subsystem 104, and networking subsystem 106.

Processing subsystem 102 can include one or more devices configured to perform computational operations. For example, processing subsystem 102 can include, but is not limited to, one or more microprocessors, ASICs, microcontrollers, or programmable-logic devices.

Memory subsystem 104 can include one or more devices for storing data and/or instructions for processing subsystem 102 and networking subsystem 106. For example, memory subsystem 104 can include DRAM, flash memory, and/or other types of memory. In addition, memory subsystem 104 can include mechanisms for controlling access to the memory. In some embodiments, memory subsystem 104 includes a memory hierarchy that includes an arrangement of one or more caches coupled to a memory for computer system 100. In some of these embodiments, one or more of the caches is located in processing subsystem 102.

In some embodiments, memory subsystem 104 is coupled to one or more high-capacity mass-storage devices (not shown). For example, memory subsystem 104 can be coupled to a magnetic or optical drive, a solid-state drive, or another type of mass-storage device. In these embodiments, memory subsystem 104 can be used by computer system 100 as fast-access storage for often-used data, while the mass-storage device is used to store less frequently used data.

Networking subsystem 106 can include one or more devices configured to couple to and communicate on a wired and/or wireless network (i.e., to perform network operations). For example, networking subsystem 106 can include, but is not limited to, a Bluetooth™ networking system, a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 106 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 106 can include one or more mechanisms for forming an ad hoc network connection (e.g., an ad-hoc wireless PAN) with other devices.

In the following description, we refer to a subset of the mechanisms used for coupling to, communicating on, and handling data and events on the network at the physical layer of each network connection collectively as the "interface" for the corresponding network connection. In some embodiments, each interface includes one or more mechanisms to enable an application (e.g., interface manager task 504 in FIG. 5) to control the operating mode of the interface.

Within computer system 100, processing subsystem 102, memory subsystem 104, and networking subsystem 106 are coupled together using bus 110. Bus 110 is an electrical connection that the subsystems can use to communicate commands and data among one another. Although only one bus 110 is shown for clarity, different embodiments can include a different number or configuration of electrical connections between the subsystems.

In some embodiments, bus 110 is a packet bus and communication among the subsystems involves sending command and data packets in predetermined formats on bus 110. In alternative embodiments, bus 110 includes one or more dedicated signal lines and communication between the subsystems involves signaling the subsystems on the one or more dedicated signal lines.

Although shown as separate subsystems in FIG. 1, in some embodiments, some or all of a given subsystem can be integrated into one or more of the other subsystems in computer system 100. Although alternative embodiments can be configured in this way, for clarity we describe the subsystems separately.

Computer system 100 can be incorporated into many different types of electronic devices. Generally, these electronic devices include any device with a network interface that can be idled. For example, computer system 100 can be part of a desktop computer, a laptop computer, a server, a media player, an appliance, a subnotebook/netbook, a tablet computer, a cellular phone, a piece of testing equipment, a network appliance, a set-top box, a personal digital assistant (PDA), a smart phone, a toy, a controller, or another device.

Although we use specific components to describe computer system 100, in alternative embodiments, different components and/or subsystems may be present in computer system 100. For example, computer system 100 may include one or more additional processing subsystems 102, memory subsystems 104, and/or networking subsystems 106. Alternatively, one or more of the subsystems may not be present in computer system 100.

In some embodiments, computer system 100 may include one or more additional subsystems that are not shown in FIG. 1. For example, computer system 100 can include, but is not limited to, a display subsystem for displaying information on a display, a data collection subsystem, an audio subsystem, an alarm subsystem, a media processing subsystem, and/or an input/output (I/O) subsystem.

Operating System

Figure 2:
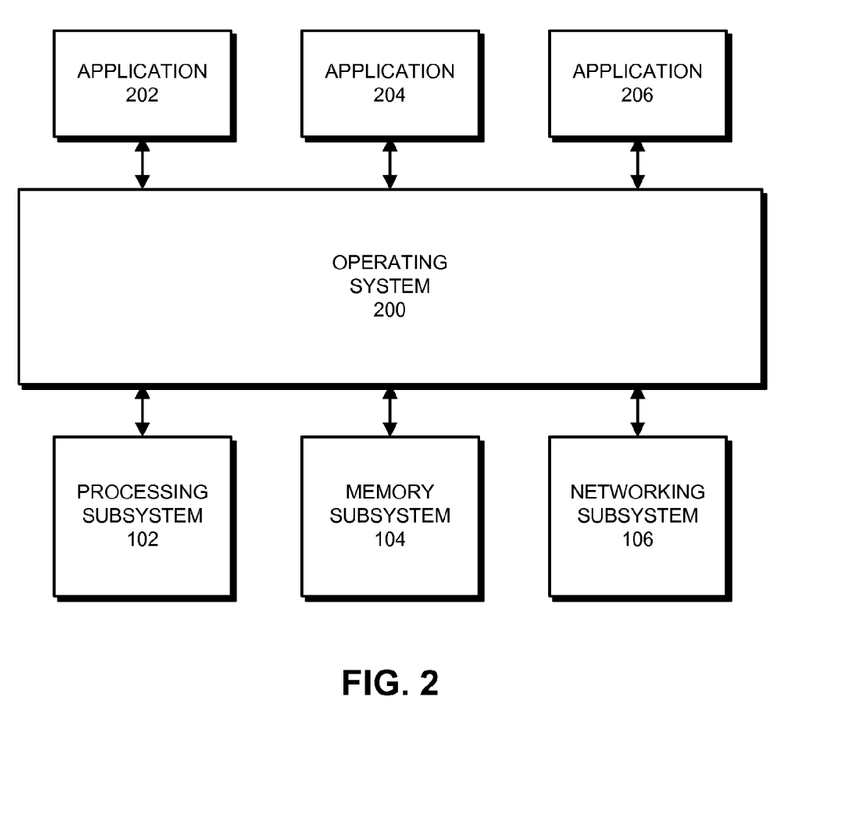
FIG. 2 presents an operating system in accordance with the described embodiments.

FIG. 2 presents an operating system 200 executed by processing subsystem 102 in accordance with the described embodiments. Generally, operating system 200 serves as an intermediary between system hardware in computer system 100 (e.g., subsystems 102-106) and applications executed by processing subsystem 102, such as applications 202-206 (which can be, for example, an email application, a web browser, and a game application, respectively). For example, operating system 200 can be, but is not limited to, the OS X operating system from Apple Inc. of Cupertino, Calif.; the FreeBSD operating system from The FressBSD Foundation of Boulder, Colo.; or another operating system. Operating systems and their general functions are known in the art and hence are not described in detail.

In the following description, we describe the embodiments using the "kernel" to refer to operating system 200. The kernel includes the core portions of operating system 200 and provides a low-level abstraction layer for the system hardware in computer system 100 that applications 202-206 can use to access and/or control the system hardware to perform their functions.

To manage the transfer of packets to and from applications in computer system 100 using an appropriate interface in networking subsystem 106, operating system 200 maintains one or more network protocol stacks (not shown) that each includes a number of logical layers. For example, the operating system can maintain an Internet protocol stack, which includes the link, Internet, transport, and application layers. As another example, the operating system can maintain a protocol stack based on the OSI model, which includes the application, presentation, session, transport, network, data-link, and physical layers. At each layer of the protocol stack, the operating system includes control mechanisms and data structures for performing the functions associated with the layer. The functions associated with each of the layers in the protocol stacks are known in the art and hence are not described in detail.

Network Connection Data Maintained by the Operating System

In the described embodiments, operating system 200 includes one or more data structures for monitoring, configuring, and/or controlling the operation of the network connections in networking subsystem 106. For example, in some embodiments, operating system 200 includes interface data structures (interchangeably "interface structs") that are used to keep records for the network interface(s) in networking subsystem 106 (e.g., Ethernet interfaces, 3G/4G cellular interfaces, Bluetooth™ interfaces, etc.). In these embodiments, the interface structs can include information and data such as the name of the interface, the address of the interface (e.g., a Media Access Control (MAC) address), interface flags, timers, operating mode data, configuration data, and/or other information about the interface. The information and data typically present in interface structs are known in the art and hence are not described in detail.

Operating system 200 can further include a set of route data structures (interchangeably "route structs") that are used to keep a record of route information to enable the operating system 200 to select an appropriate network interface for transmitting packets to a given destination. In the described embodiments, when a route to a particular subnet or destination is requested by an application and resolved, operating system 200 creates a route struct with information about the route. Alternatively, a "template" route for a subnet or destination with an existing route struct can be copied to create a "clone" route, and operating system 200 can create a route struct with information about the cloned route. The information in the route struct can then be used to route packets using an associated interface in networking subsystem 106. In the described embodiments, route structs can include information such as a destination address for the route, a gateway address, flags, an application reference count (i.e., a count of the applications that are using the route), a use count, an interface ID, and other information about the route. The information and data typically present in route structs are known in the art and hence are not described in detail.

In the described embodiments, more than one application can be using a route described in a given route struct to transmit packets to an associated destination. In these cases, the application reference count in the route struct can be incremented to indicate that there are multiple applications using the route.

In the described embodiments, operating system 200 may include one or more interfaces in networking subsystem 106 that include multiple associated interface structs. For example, a WiFi network interface in networking subsystem 106 can provide multiple virtual interfaces used to handle multiple peer-to-peer network connections. Although we describe the embodiments using a single interface struct for clarity, the embodiments with multiple interface structs function in a similar way. For example, some embodiments include a Bluetooth interface with multiple interface structs. Using similar mechanisms to the mechanisms described below, these embodiments can idle the interface when the interface structs are not referred to by any route(s).

The interface data structures in the described embodiments differ from existing interface data structures because the interface data structures in the described embodiments include: (1) an aggressive-idling flag; and (2) a route reference counter. As described in detail below, the aggressive-idling flag is used by operating system 200 to determine which interfaces should be aggressively idled, and the route reference counter is used to keep track of the number of routes that refer to the interface (i.e., routes that can be determined to be using/referring to the interface by checking an interface ID in the corresponding route struct). Note that "aggressive" as used in this description to describe interface idling indicates an interface idling that is responsive to actual operating conditions within computer system 100 and networking subsystem 106. The more responsive idling enables computer system 100 to optimize the power consumption of the interfaces, and balance the power consumption against the responsiveness of the interfaces to requests from and data transfers for applications.

Figure 3:
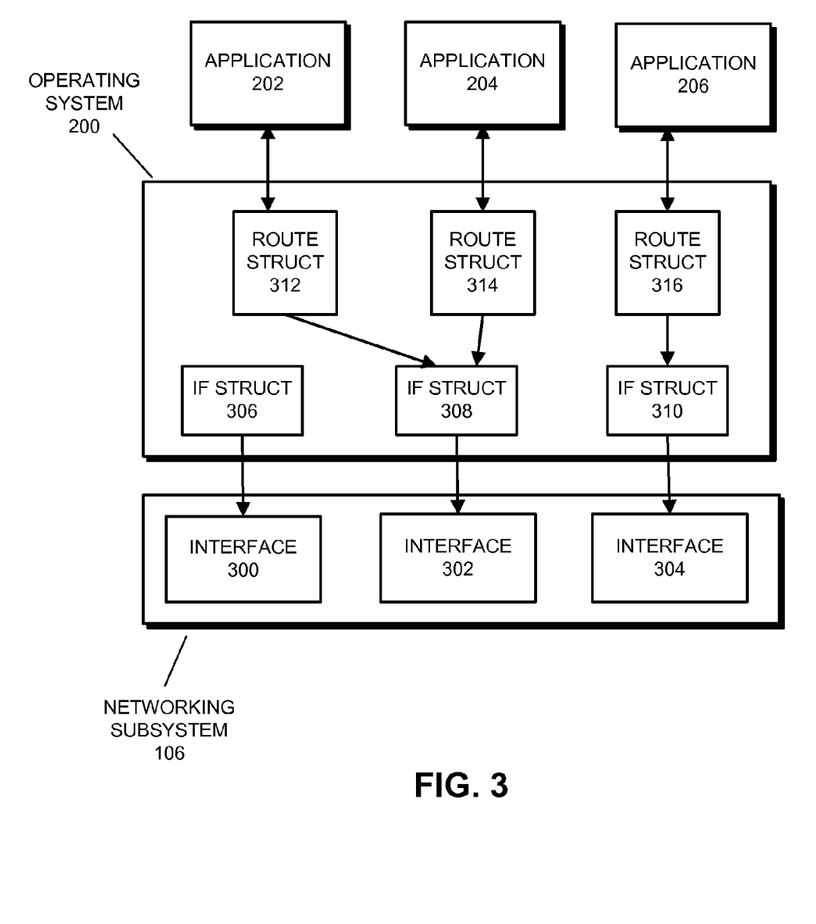
FIG. 3 presents a block diagram illustrating exemplary interface data structures and route data structures in an operating system in accordance with the described embodiments.

FIG. 3 presents a block diagram illustrating exemplary interface (IF) structs 306-310 and route structs 312-316 in operating system 200 in accordance with the described embodiments. As can be seen in FIG. 3, networking subsystem 106 includes interfaces 300-304, which can be, for example, a Bluetooth™ interface, an Ethernet interface, and an 802.11 wireless network interface, respectively. As described above, applications 202-206 can be, for example, an email application, a web browser, and a game application, respectively, that each use a route in operating system 200 and a corresponding interface 300-304 in networking subsystem 106 to transfer data packets to other devices.

In the illustrated embodiment, operating system 200 has established routes to enable the transfer of packets to corresponding destination hosts via interfaces 302 and 304. Note that the routes shown in FIG. 3 as being available in operating system 200 are simplified for the purpose of illustration; alternative embodiments include additional and/or different types of routes. For example, a default route can be established for interface 300. In addition, we use already-established routes; techniques for establishing these routes (particularly in accordance with the network protocol with which each route is associated) are known in the art and hence are not described in detail.

Interface structs 306-310 contain information and data that enables operating system 200 to determine the identity, configuration, capabilities, and requirements of underlying interfaces 300-304, respectively. Route structs 312-316 contain information and data that enables operating system 200 to route packets on these routes to the associated interfaces from among interfaces 300-304. For example, along with information that identifies the destination of the route, the number of open sockets/applications that refer to the route, and the type and configuration of the route, route struct 312 also includes a pointer to interface struct 308. As described above, interface struct 308 includes the interface name and/or MAC address that direct operating system 200 to interface 302 when using the associated route.

In the illustrated embodiment, applications 202 and 204 are using routes that refer to the same interface 302. For example, assuming that interface 302 is an Ethernet interface, both applications can be using separate routes (e.g., with different destination hosts), which causes operating system 200 to forward packets from the applications to the Ethernet interface to be sent to the destination for the route. In this case, a route reference counter in interface struct 308, which is pointed at by route structs 312 and 314, can indicate that two routes refer to interface 302. In contrast, the route reference counter in interface struct 310, which is associated with interface 304 and pointed at only by route struct 316, can indicate that one route refers to interface 304.

In some embodiments, computer system 100 includes a device driver for each interface. When executed, the device driver can configure the interface to be aggressively idled (i.e., set the aggressive-idling flag in the corresponding interface struct in operating system 200). Alternatively, operating system 200, using an environment variable, file, or operating system switch, can configure the interface to be aggressively idled.

Note that the route and interface structs may be arranged in numerous ways in operating system 200 to enable accessing and reading the information in the structs. For example, in some embodiments, the route and/or interface structs can be organized into a linked list in operating system 200. The arrangements for the structs in operating system 200 are generally known in the art and hence are not described in detail.

Expiring Routes

In the described embodiments, some routes are maintained only temporarily by operating system 200. Route structs, and therefore corresponding entries in a routing table for operating system 200, are kept available for these routes by operating system 200 for only a predetermined time after the route is no longer being used by at least one application. When the predetermined time expires, the route struct can be deleted, thereby removing the route from the routing table maintained by operating system 200.

More specifically, in the described embodiments, operating system 200 provides mechanisms that enable applications to open sockets so that the applications can send data packets to lower layers in the network protocol stack to be forwarded to a given destination host. When an application has finished using the socket or loses the network connection, the application closes the socket. Alternatively, if the application crashes, operating system 200 can close the socket. Closing the socket causes operating system 200 to decrement an application reference count in the route struct for the associated route. If the application was the last application that was using the route, the decrement operation causes the application reference count in the route struct to drop to zero.

When a route struct's application reference count drops to zero, operating system 200 updates an expiration timer in the route struct to a predetermined value and starts a countdown for the route struct using the expiration timer. When the expiration timer equals zero, the route struct is available for deletion by operating system 200. (Note that the actual deletion of the route may not happen until a deletion mechanism subsequently deletes expired route structs.)

As described below, the described embodiments can include a number of different deletion mechanisms for deleting expired routes. For example, operating system 200 can include a default route expiration mechanism in the network protocol stack. In addition, operating system 200 can include a drain function 412 (see FIG. 4) associated with a route protocol domain 406 that is executed by operating system 200 as long as at least one active interface is configured for aggressive idling.

In these embodiments, the predetermined value to which the expiration timer is set depends on the configuration of the interface that the route references (i.e., the interface identified in the route struct). If the route references an interface that is configured for aggressive idling, the predetermined value is a shorter, aggressive value. For example, the described embodiments can use values such as 10 seconds, 30 seconds, 1 minute, 5 minutes, or another value. Alternatively, if the route references an interface that is not configured for aggressive idling, the predetermined value is a default (longer) value. For example, the described embodiments can use values such as 20 minutes, 1 hour, 24 hours, 2 days, or another value.

Note that for some embodiments the predetermined value used for routes that reference interfaces that are not configured for aggressive idling is the same value that is used for expiring routes in existing systems. For example, some embodiments use a default value of 20 minutes for ARP routes that reference interfaces that are not configured for aggressive idling.

The described embodiments differ from existing systems because the expiration time for routes is set differently based on whether the route references an interface that is configured for aggressive idling. By setting the route expiration value to the shorter value when the referenced interface is configured for aggressive idling, operating system 200 ensures that the route expires more quickly than routes in existing systems (typically several orders of magnitude more quickly). This, in turn, enables operating system 200 to more quickly idle the underlying interface, which can help to prevent interfaces being unnecessarily maintained in an active state for routes that are not being used.

Deleting Expired Routes Using Protocol Stack Mechanism

As described above, operating system 200 can include protocol-stack mechanisms for deleting old/expired data for the associated network protocol stack. Generally, the protocol-stack mechanisms are run on a predetermined interval by operating system 200. For example, in some embodiments, the protocol-stack mechanisms can be run on a 10-minute interval. The protocol-stack mechanisms can delete route structs for which the expiration timer has reached zero. Protocol-stack mechanisms are known in the art and hence are not described in detail.

Deleting Expired Routes Using Routine-Domain-Specific Drain Function

Figure 4:
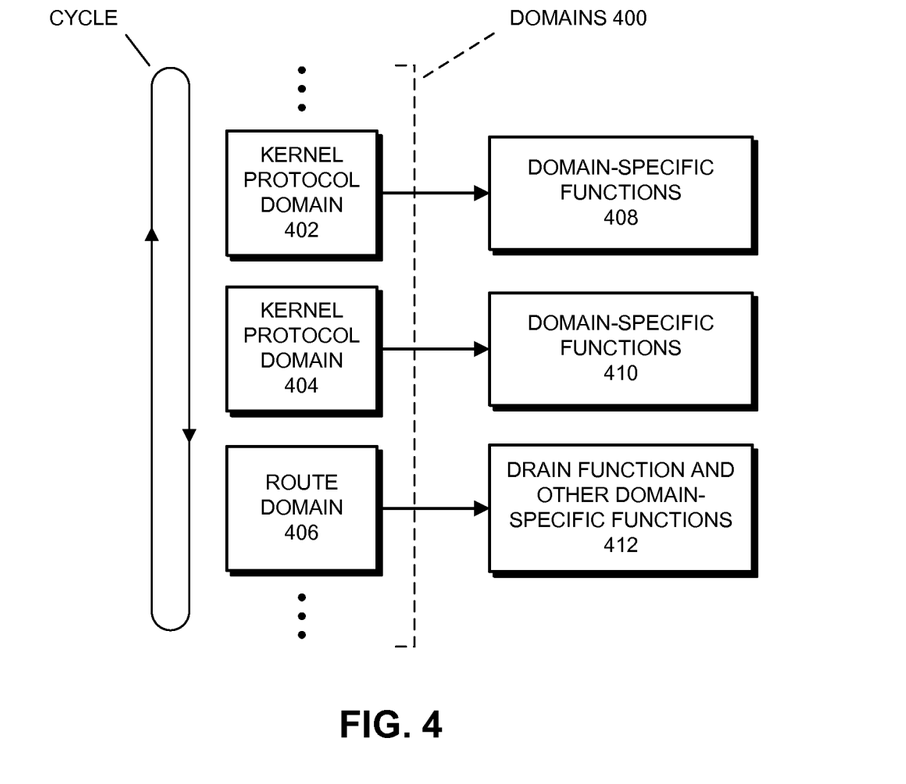
FIG. 4 presents a block diagram illustrating a number of exemplary kernel protocol domains and their associated domain-specific functions in accordance with the described embodiments.

Operating system 200 provides mechanisms for periodically cycling through a set of kernel protocol domains to perform tasks associated with the kernel protocol domains. FIG. 4 presents a block diagram illustrating a number of exemplary kernel protocol domains 400 and their associated domain-specific functions 408-412 in accordance with the described embodiments.

As can be seen in FIG. 4, domains 400 include kernel protocol domains 402-404 and route domain 406. Kernel protocol domains 402 and 404 can each be one of a number of different protocol domains. Specifically, any kernel protocol supported by operating system 200 can have a kernel protocol domain. As one example, kernel protocol domain 402 can include an IPv4 domain and kernel protocol domain 404 can include an address resolution protocol (ARP) domain. Alternatively, kernel protocol domain 402 can include an IPv6 domain and kernel protocol domain 404 can include an IPv6 neighbor discovery (ND) domain. Route domain 406 is also a kernel protocol domain, but is specifically enumerated because the "drain" function in domain-specific functions 412 can be used to delete expired routes in the described embodiments as described below.

Each of the kernel protocol domains 402-406 includes a set of pointers to a set of domain-specific functions 408-412, respectively. In some embodiments, each domain-specific function can be indicated by a pointer from the corresponding kernel protocol domain. Within each set of domain-specific functions 408-412 are functions that are executed by operating system 200 to perform an action associated with the corresponding domain. As an example, one domain-specific function is a drain function, which can remove old/expired domain data from processing subsystem 102 and computer system 100. In addition, the domain-specific functions can include an input function, an output function, and other functions.

During operation, operating system 200 periodically cycles through kernel protocol domains 402-406 (and any additional kernel protocol domains, as indicated by the ellipses) as shown by the "cycle" in FIG. 4. For each domain, operating system 200 follows the pointers from the domain to execute the domain-specific functions. In this way, operating system 200 can periodically execute the domain-specific functions to perform updating, configuring, and/or garbage collection operations for the kernel protocol.

Upon reaching the route domain 406, which handles data for routes present in operating system 200 (e.g., ARP routes, ND6 routes, IPv6 routes, IPv4 routes, etc.), while cycling through the kernel protocol domains 402-406, operating system 200 follows the pointers from route domain 406 to the drain function and the other route domain-specific functions 412 to execute these functions. Executing the drain function causes operating system 200 to immediately check each route struct (e.g., route structs 312-316) to determine if an expiration timer for the route struct has reached zero. For each of the route structs for which the expiration timer has reached zero, operating system 200 deletes the route struct, thereby removing the route from operating system 200.

In some embodiments, the cycle time for operating system 200 through the kernel protocol domains is approximately 500 milliseconds. This means that the operating system can attempt to execute the drain function for route domain 406 approximately every half second. To avoid keeping operating system 200 unnecessarily busy executing the drain function to check for expired routes, in some embodiments, the drain function includes a mechanism that causes operating system 200 to execute the drain function every Nth cycle through the kernel protocol domains. Specifically, route domain 406 includes a timer value that is checked immediately upon entering the drain function. This timer is set for a designated time (e.g., 10 seconds, 30 seconds, or 1 minute), and before the timer reaches zero, operating system 200 skips the drain function. However, when the timer reaches zero, operating system 200 executes the rest of the drain function, which causes the operating system 200 to check the route structs for expired routes.

Determining that Interfaces can be Idled Based on Route Deletion

In the described embodiments, as a given route struct is deleted (thereby deleting the route from operating system 200), operating system 200 determines which interface is referenced in the route struct. Operating system 200 then decrements a route reference counter in the interface struct for the referenced interface. For example, when deleting route struct 312, operating system 200 determines that interface 302 is the interface referenced by route struct 312 (and hence the interface for the route is interface 302). Operating system 200 then decrements the route reference counter in IF struct 306.

In this way, when the last route that refers to a given interface is deleted, the route reference counter in the interface is decremented to zero. Upon determining that the route reference counter is zero, operating system 200 signals a configuration agent (see configuration agent 502 in FIG. 5) so that the configuration agent can forward a notice to one or more applications that the interface is a candidate for idling. In some embodiments, operating system 200 only signals the configuration agent when the aggressive-idling flag is set in the interface struct for the interface. In these embodiments, if the aggressive idling flag is not set for a given interface, operating system 200 can ignore the decrementing of the route reference counter to zero.

Configuration Agent and Interface Manager Task

Figure 5:
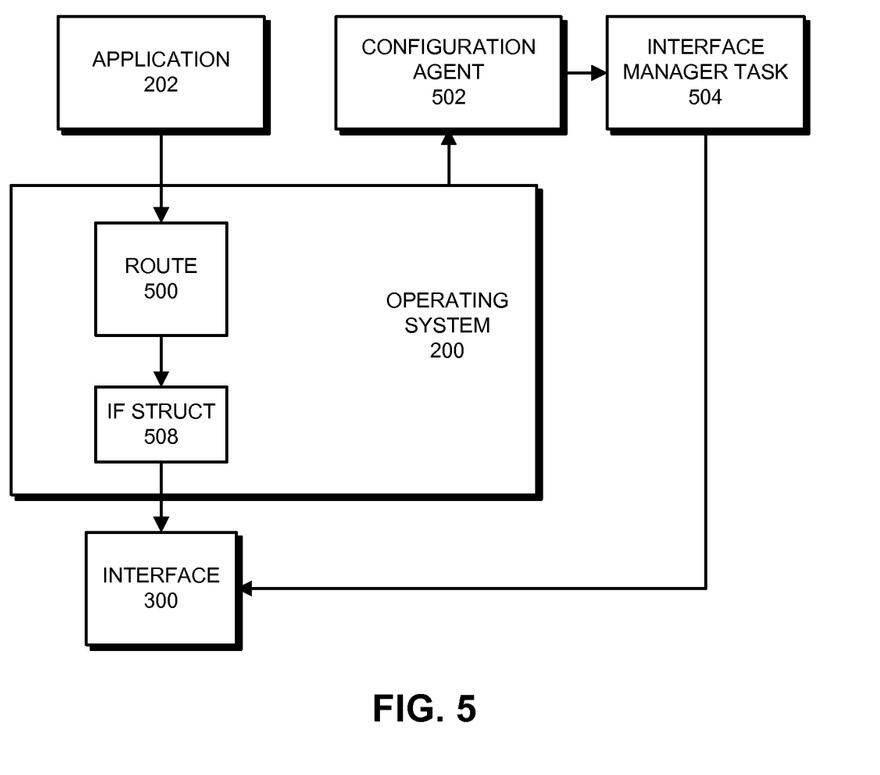
FIG. 5 presents a block diagram of an operating system and a number of applications in accordance with the described embodiments.

FIG. 5 presents a block diagram of an operating system interacting with a number of applications in accordance with the described embodiments. The applications in FIG. 5, which are executed by processing subsystem 102 in computer system 100, include application 202, configuration agent 502, and interface manager task 504.

Route 500 is a route used by operating system 200 for routing packets from application 202 through interface 300 to a destination host. For clarity, route 500, interface struct 508, and interface 300 are described only generally (e.g., a route struct is not shown for route 500).

Configuration agent 502 manages one or more configuration aspects of processing subsystem 102. Configuration agent 502 can maintain data reflecting the desired and current state of processing subsystem 102/computer system 100, provide notifications to applications (e.g., application 202 and/or interface manager task 504) when this data changes, and/or perform associated configuration tasks. Generally, configuration agent 502 relies on one or more input sources (preferences, low-level kernel events, notifications, etc.) and, using a set of policy modules included in configuration agent 502, interacts with processing subsystem 102/computer system 100 to establish the desired operational configuration. For example, in some embodiments, configuration agent 502 is a configuration agent similar to "configd" from Apple Inc. of Cupertino, Calif. Configuration agents are known in the art and hence are not described in detail.

Unlike existing configuration agents, configuration agent 502 includes a mechanism for accepting a notification from operating system 200 that an interface has no routes referring to the interface and thus the interface may be a candidate for idling. In addition, configuration agent 502 includes a mechanism for sending a notification to other applications to notify these applications that an interface is a candidate for idling.

Interface manager task 504 controls the operation of interface 300. For example, interface manager task 504 can initialize interface 300, configure the operating mode of interface 300, power-down interface 300, receive control messages from and send control messages to operating system 200 relating to interface 300, and perform other operations on or for interface 300.

In the some embodiments, interface manager task 504 registers with configuration agent 502 to be notified when interface 300 can be idled (i.e., is a candidate for idling). In these embodiments, upon determining that a route reference counter in interface struct 508 has been decremented to zero and hence no active routes refer to the interface, operating system 200 signals configuration agent 502 that interface 300 has no more routes referring to it. Configuration agent 502 then sends a notification to interface manager task 504 that interface 300 is a candidate for idling.

In some embodiments, upon receiving the notification that interface 300 is a candidate for idling, interface manager task 504 checks with operating system 200 to ensure that no route that refers to interface 300 has been established since the notification was sent by operating system 200. Operating system 200 can then check the route reference counter in interface struct 508 for interface 300 to determine if the value is non-zero (i.e., if a newly established route is referring to interface 300).

If a new route that refers to interface 300 has been established, interface manager task 504 can ignore the notification and leave the operating mode of interface 300 unchanged. In these embodiments, by performing this check, interface manager task 504 can avoid erroneously idling an active interface based on a notification that may have been delayed before being received by interface manager task 504 (i.e., if operating system 200 was busy and did not immediately send the notification to configuration agent 502, or if configuration agent 502 was delayed in sending the notification to interface manager task 504). In other words, interface manager task 504 can avoid incorrectly making a decision to idle interface 300 based on a race condition between the notification signal and the establishment of the new route in operating system 200.

Otherwise, interface manager task 504 can idle the interface. As described above, idling the interface can mean different things depending on the embodiment. For example, "idling" can mean that the interface is to be completely powered-down, switched to a low-power (but at least partially operational) mode, or used normally, but for performing low-priority or interface maintenance operations.

Interface manager task 504 differs from existing interface manager tasks because interface manager task 504 can receive a notification from configuration agent 502 that an interface is a candidate for idling. In addition, upon receiving the notification, interface manager task 504 can check with operating system 200 to determine if the interface is being referred to by any routes before idling the interface.

Note that, although only one configuration agent and one interface manager task are shown in FIG. 5, in some embodiments multiple configuration agents and/or interface manager tasks can be executed in computer system 100. In addition, interface manager task 504 can be an interface manager task for more than one interface.

Aggressive Interface Counter

In some embodiments, operating system 200 maintains an "aggressive interface counter" that operating system 200 uses to keep track of the number of active interfaces that are configured to be aggressively idled. As each interface that is configured to be aggressively idled is activated, operating system 200 increments the aggressive interface counter. On the other hand, as each interface that is configured to be aggressively idled is idled, operating system 200 decrements the aggressive interface counter.

When the aggressive interface counter is equal to zero (i.e., all interfaces configured for aggressive idling are idle), operating system 200 sets the pointer to drain function 412 in route domain 406 to NULL. However, any time that the aggressive interface counter is non-zero, operating system 200 sets the pointer to the drain function in route domain 406 to point to the drain function. By setting the pointer in this way, these embodiments only execute the drain function while at least one interface that is configured to be aggressively idled is active.

Process for Managing an Interface

Figure 6:
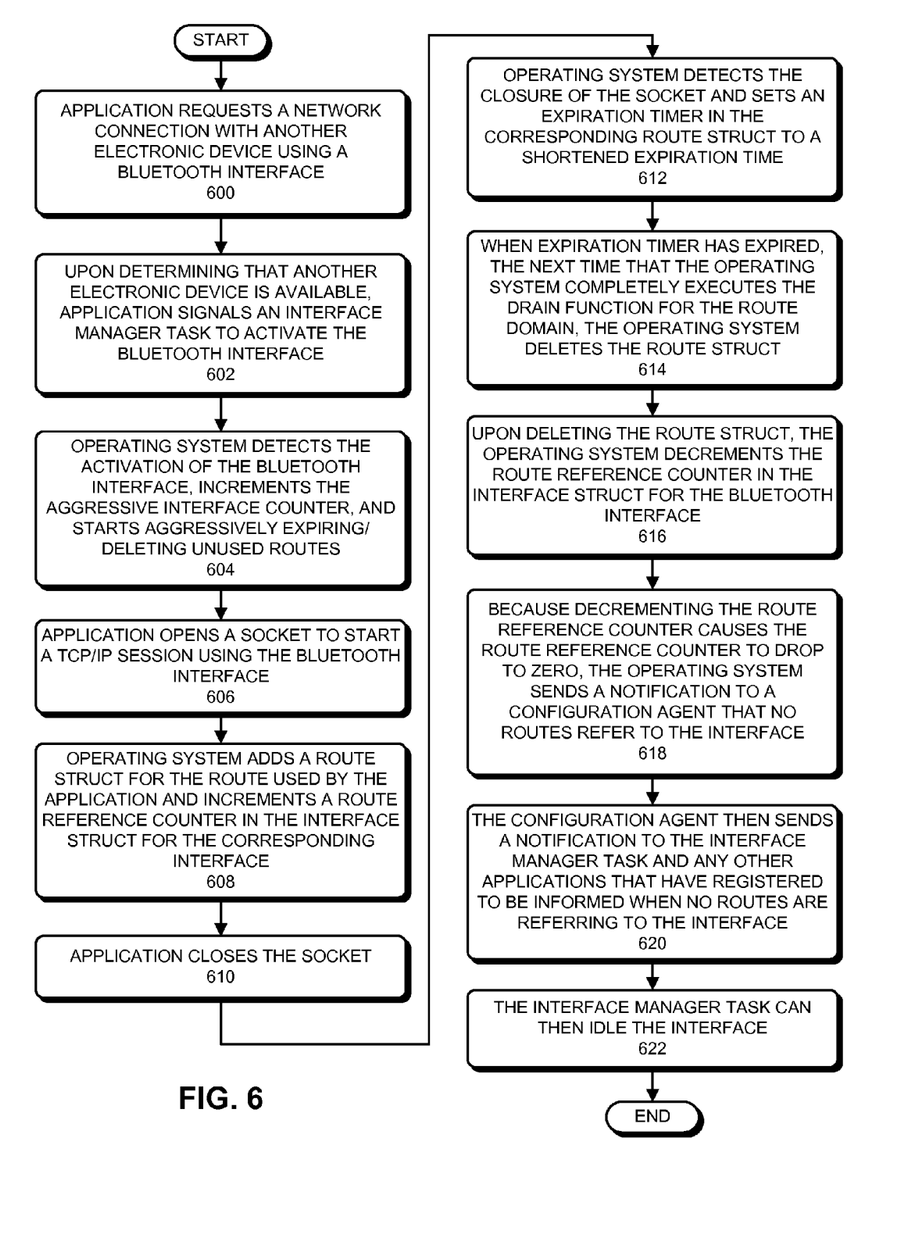
FIG. 6 presents a flowchart illustrating a process for managing an interface in accordance with the described embodiments.

FIG. 6 presents a flowchart illustrating a process for managing an interface in accordance with the described embodiments. More specifically, in FIG. 6, we describe the management of a Bluetooth™ interface in networking subsystem 106 that is configured to be aggressively idled. For this example, we assume that the Bluetooth™ interface is initially idle. In addition, we assume that no other interfaces that are configured to be aggressively idled are active, and hence the aggressive interface counter is equal to zero, and operating system 200 is not executing drain function 412 for route domain 406 (i.e., the pointer to drain function 412 in route domain 406 is pointed to NULL).

Although we describe the process for managing an interface using the Bluetooth™ interface as an example, alternative embodiments use different interfaces. These alternative embodiments can include more or fewer and/or different steps in the process. For example, the resolution of the other device and/or the address for the other device may be done differently or not at all (a destination address may be known, etc.). The alternative embodiments otherwise operate in a similar way to the described embodiment.

The process in FIG. 6 starts when an application being executed by processing subsystem 102 requests a network connection with another electronic device using a Bluetooth™ interface (step 600). For example, a game application can request the formation of a Bluetooth™ connection with another electronic device that is running the game application that will be used for transferring game data between the devices. The application then starts a process to find the other device and resolve a destination Internet protocol (IP) address for the other device. For example, the application can start a Bonjour™ service from Apple Inc. of Cupertino, Calif., or can start another address-resolution service.

When another device is determined to be available, the application signals interface manager task 504 (e.g., a Bluetooth™ server) to activate the Bluetooth™ interface (step 602). Interface manager task 504 then activates the Bluetooth™ interface, making the Bluetooth™ interface ready to transmit and receive packets for the application.

Recall that the Bluetooth™ interface is configured to be aggressively idled (and hence the aggressive-idling flag is set in the interface struct for the Bluetooth™ interface in operating system 200). Thus, when the Bluetooth™ interface is activated, operating system 200 increments the aggressive interface counter and starts aggressively expiring and deleting unused routes (step 604). More specifically, operating system 200 adjusts the pointer for drain function 412 in route domain 406 from pointing to NULL to point to drain function 412. By incrementing the aggressive interface counter, operating system 200 records that an active interface is configured for aggressive idling. In addition, adjusting the pointer for drain function 412 in route domain 406 causes operating system 200 to execute drain function 412 on each pass through domains 400 (more specifically, on each pass through route domain 406).

As described above, drain function 412 is executed on each pass through route domain 406, but an internal counter in drain function 412 prevents operating system 200 from completely executing drain function 412 until a predetermined time has passed. For example, drain function 412 can include a countdown counter that expires in X seconds (or Y cycles through route domain 406). When operating system 200 checks the counter in drain function 412 and finds the counter expired, operating system 200 executes the remainder of drain function 412 and resets the internal counter. When the remainder of drain function 412 is executed, it causes operating system 200 to check each route struct (e.g., route structs 312-316) to determine which routes have expired and can therefore be deleted.

The application then opens a socket to start a transmission control protocol/Internet protocol (TCP/IP) session using the Bluetooth™ interface (step 606). More specifically, the application opens a socket to commence sending packets to the other device at the destination IP address using the Bluetooth interface. Operating system 200, in response to receiving a notification of the opening of the socket, creates a route struct (which can be cloned from a template route) that contains information about the route (step 608), including a reference/pointer to the Bluetooth™ interface, thereby adding the route to the routing table in operating system 200. In addition, operating system 200 increments a route reference counter in the interface struct for the Bluetooth™ interface (step 608), recording that the route is depending on the Bluetooth™ interface. Operating system 200 can then start forwarding packets to the corresponding destination from the application using the Bluetooth™ interface.

When the application has finished using the route (or the Bluetooth™ connection has been lost), the application closes the socket (step 610). In response to receiving a notification from the associated layer of the network protocol stack that the application closed the socket, operating system 200 starts the process of deleting the associated route. Specifically, operating system 200 sets an expiration timer in the route struct to the shortened expiration time (step 612). As described above, the expiration timer is set to the shortened expiration time because the aggressive-idling flag in the interface struct for the Bluetooth™ interface is set.

If the aggressive-idling flag was not set in the interface struct for the Bluetooth™ interface, operating system 200 would set the expiration timer in the route struct to a default value that is typically at least several orders of magnitude larger than the shortened expiration time. In this case, operating system 200 would also not be executing drain function 412 for route domain 406 (because the pointer to drain function 412 would still be set to NULL), and so the associated mechanism in the protocol stack for removing expired routes would be responsible for deleting the route struct (thereby removing the expired route from the routing table). Because the mechanism in the protocol stack runs at a much longer interval than the interval of drain function 412, the combination of the longer default expiration time and the longer interval for the mechanism in the protocol stack leads to the route not being deleted for a much longer time than when the route is deleted by the drain function based on the shortened expiration time.

When the shortened expiration timer in the route struct reaches zero, the next time that operating system 200 completely executes drain function 412, operating system 200 deletes the route struct (step 614), thereby removing the route from operating system 200's routing table. When deleting the route struct, operating system 200 also triggers a callback to an interface update function with a pointer to the interface to which the route refers. The callback causes operating system 200 to decrement the route reference counter for the interface struct for the Bluetooth™ interface to reflect the deletion of the route that referred to the interface (step 616).

Because, as we described above, the route was the only route that was associated with the interface, decrementing the route reference counter for the interface struct when the route struct is deleted causes the route reference counter in the interface struct to be decremented to zero. Operating system 200 determines that the route reference counter for the interface struct has been decremented to zero and sends a message to configuration agent 502 to inform configuration agent 502 that the interface is no longer referred to by any routes (step 618).

Upon receiving the message from operating system 200, configuration agent 502 sends a notification to interface manager task 504 and any other applications that have registered with configuration agent 502 to be informed when no routes are referring to the interface (step 620). Interface manager task 504 can then idle the Bluetooth™ interface (step 622).

Figure 7:
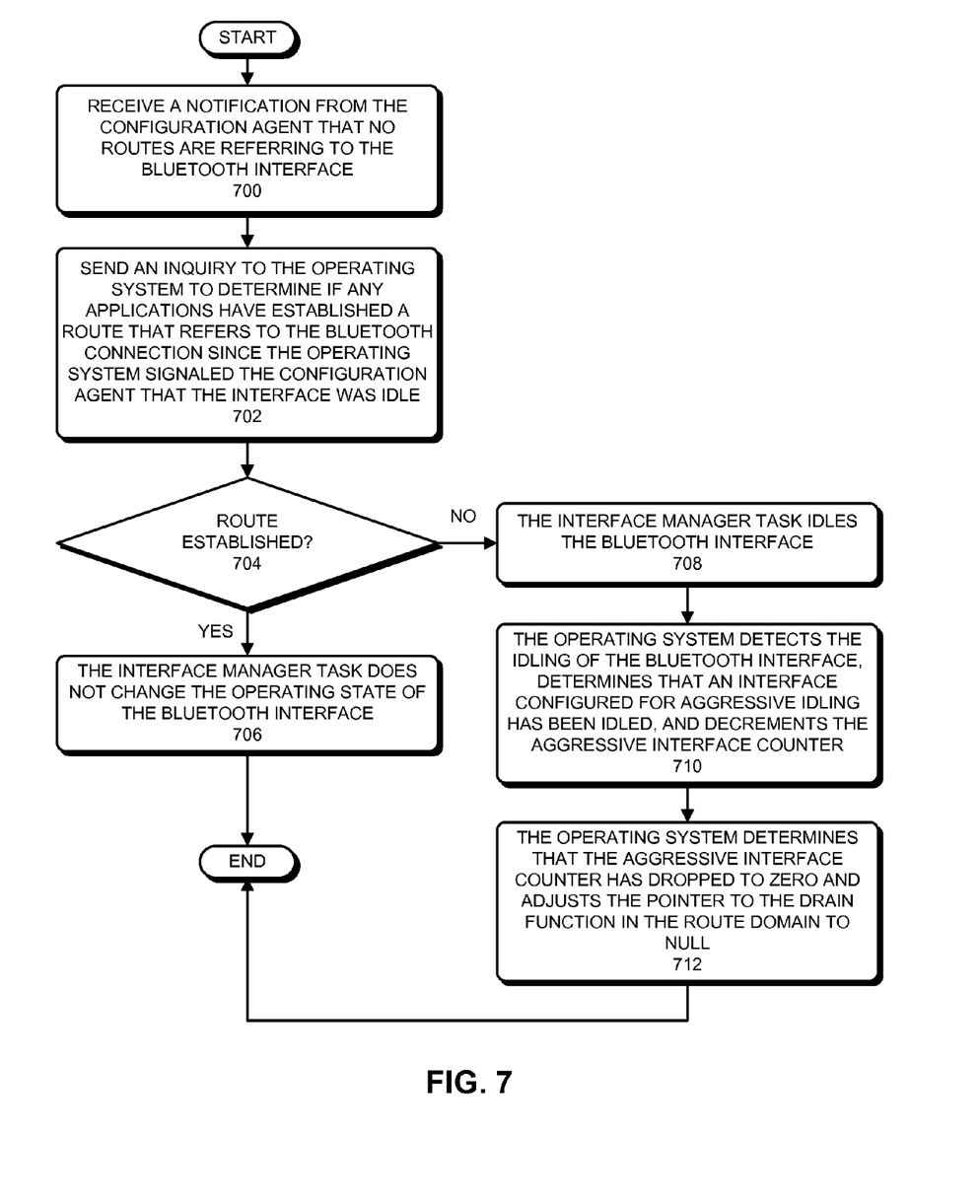
FIG. 7 presents a flowchart illustrating a process for idling an interface in accordance with the described embodiments.

FIG. 7 presents a flowchart illustrating a process for idling the Bluetooth™ interface in accordance with the described embodiments. More specifically, the embodiment illustrated in FIG. 7 is an expanded view of step 622 of FIG. 6 in accordance with the described embodiments.

The process shown in FIG. 7 starts when interface manager task 504 receives a notification from configuration agent 502 that no routes are referring to the Bluetooth™ interface (step 700). Interface manager task 504 then sends an inquiry to operating system 200 to determine if a route referring to the Bluetooth™ interface has been established by an application since operating system 200 signaled configuration agent 502 that the interface was idle (step 702).

In these embodiments, if a route has been established that refers to the interface (step 704), interface manager task 504 leaves the Bluetooth™ interface in the active state (i.e., does not change a current operating state of the Bluetooth™ interface) (step 706).

Otherwise, if no routes have been established that refer to the interface (step 704), interface manager task 504 idles the Bluetooth™ interface (step 708). As described above, when idling the interface, interface manager task 504 can power-down the Bluetooth™ interface, place the Bluetooth™ interface in a lower-power operating mode (e.g., change the operating speed of the interface, etc.), and/or use the Bluetooth™ interface for performing low-priority operations.

When interface manager task 504 idles the Bluetooth™ interface, operating system 200 detects the idling of the interface and determines that an interface in the aggressive idle mode has been idled. Operating system 200 then decrements the aggressive interface counter (step 710). Because the interface was the only, and therefore last, active interface to be configured to be aggressively idled, decrementing the aggressive interface counter causes the aggressive interface counter to equal zero. Based on the zeroing of the aggressive interface counter, operating system 200 adjusts the pointer for drain function 412 in route domain 406 from pointing to drain function 412 to pointing to NULL (step 712), which means that operating system 200 does not execute drain function 412 on each pass through domains 400.

Note that, in contrast to existing systems where the interface manager task 504 monitors only traffic at the physical layer (i.e., actual packet transmission) on the Bluetooth™ interface to determine when to idle the Bluetooth™ interface, in the described embodiments, interface manager task 504 receives information from within the operating system about the number of routes that refer to a particular interface. Using this information, the Bluetooth™ server can power-down the interface in a way that is more appropriate for operations actually being performed in computer system 100 (i.e., only when no routes are using the interface).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments.

What is claimed is:

1. A method for configuring a network interface, comprising:
    receiving a signal that was sent from an operating system indicating that the network interface can be idled, wherein the signal is sent from the operating system as soon as the operating system determines that a final route structure that depended on the network interface has expired and been deleted; and
    determining if an application has established, after the signal was sent from the operating system, a route that uses the network interface, wherein determining if an application has established a route includes one of querying the operating system or an application to determine if another application has established a route or searching any route structures in the operating system to find a matching route,
    if an application has not established, after the signal was sent from the operating system, a route that uses the network interface, causing the network interface to be idled;
    otherwise, if an application has established, after the signal was sent from the operating system, a route that uses the network interface, leaving the network interface in a current operating state.

2. The method of claim 1, wherein causing the network interface to be idled involves one of:
    powering-down the network interface;
    switching the network interface to a low-power mode; or
    configuring the network interface to be used at a normal/active power level, but only for performing low-priority or maintenance operations.

3. The method of claim 1, wherein causing the network interface to be idled includes causing at least one other application to place the network interface in an idled state.

4. The method of claim 3, wherein the at least one other application includes:
    an interface manager; or
    another application that can place the network interface in the idle state.

5. A non-transitory computer-readable storage medium storing instructions for a configuration application that, when executed by a computer system, cause the computer system to perform a method for configuring a network interface, the method comprising:
    receiving a signal that was sent from an operating system indicating that the network interface can be idled, wherein the signal is sent from the operating system as soon as the operating system determines that a final route structure that depended on the network interface has expired and been deleted; and
    determining if an application has established, after the signal was sent from the operating system, a route that uses the network interface, wherein determining if an application has established a route includes one of querying the operating system or an application to determine if another application has established a route or searching any route structures in the operating system to find a matching route;
    if an application has not established, after the signal was sent from the operating system, a route that uses the network interface, causing the network interface to be idled;
    otherwise, if an application has established, after the signal was sent from the operating system, a route that uses the network interface, leaving the network interface in a current operating state.

6. The computer-readable storage medium of claim 5, wherein causing the network interface to be idled includes one of:
    powering-down the network interface;
    switching the network interface to a low-power mode; or
    configuring the network interface to be used at a normal/active power level, but only for performing low-priority or maintenance operations.

7. The computer-readable storage medium of claim 5, wherein causing the network interface to be idled includes causing at least one other application to place the network interface in an idled state.

8. The computer-readable storage medium of claim 7, wherein the at least one other application includes:
    an interface manager; or
    another application that can place the network interface in the idle state.

9. An apparatus that configures a network interface, comprising:
    the network interface; and
    a processing subsystem coupled to the network interface;
    wherein the processing subsystem and the network interface perform operations for:
        receiving a signal that was sent from an operating system indicating that the network interface can be idled, wherein the signal is sent from the operating system as soon as the operating system determines that a final route structure that depended on the network interface has expired and been deleted; and
        determining if an application has established, after the signal was sent from the operating system, a route that uses the network interface, wherein determining if an application has established a route includes one of querying the operating system or an application to determine if another application has established a route or searching any route structures in the operating system to find a matching route;
        if an application has not established, after the signal was sent from the operating system, a route that uses the network interface, causing the network interface to be idled;
        otherwise, if an application has established, after the signal was sent from the operating system, a route that uses the network interface, leaving the network interface in a current operating state.

10. The apparatus of claim 9, wherein causing the network interface to be idled includes one of:
    powering-down the network interface;
    switching the network interface to a low-power mode; or
    configuring the network interface to be used at a normal/active power level, but only for performing low-priority or maintenance operations.

11. The apparatus of claim 9, wherein causing the network interface to be idled includes causing at least one other application to place the network interface in an idled state.

12. The apparatus of claim 11, wherein the at least one other application includes:
- an interface manager; or
- another application that can place the network interface in the idle state.

\* \* \* \* \*